United States Patent [19]

Hata et al.

[11] 3,879,187

[45] Apr. 22, 1975

[54] BIOLOGICALLY ACTIVATING COMPOSITION

[75] Inventors: Kunio Hata; Kingo Yokota; Yoshio Tsutsui, all of Akita; Shoji Yamashita, Aichi, all of Japan

[73] Assignee: Jujo Paper Co., Ltd., Tokyo, Japan

[22] Filed: Nov. 15, 1971

[21] Appl. No.: 199,047

[52] U.S. Cl. .......................... 71/77; 71/88; 71/123
[51] Int. Cl. ........................................... A01n 21/02
[58] Field of Search .............. 71/77, 68, 79, 123, 88

[56] References Cited
UNITED STATES PATENTS

| | | | |
|---|---|---|---|
| 3,279,910 | 10/1966 | Bruinsma | 71/88 X |
| 3,537,838 | 11/1970 | Oeniu et al. | 71/77 |

*Primary Examiner*—James O. Thomas, Jr.
*Attorney, Agent, or Firm*—Fred Philpitt

[57] ABSTRACT

An aqueous solution of the mixture of α-tocopherol and ubiquinone is prepared by mixing α-tocopherol and ubiquinone in the presence of a nonionic surfactant of polyoxyalkylene system such as polyoxyethylenesorbitan monostearate or monooleate and diluting the mixture with water. The solution contains $10^{-15} - 10^{-2}$ mole/liter each of α-tocopherol and ubiquinone in a mol ratio of from 1:19 to 7:3 and 0.2 – 0.5% by weight of the surfactant, based on the total weight of the solution. The solution is stabilized by heating the solution under atmospheric pressure or under a pressure for a short time immediately after the preparation of the solution. The solution is also prepared by using a hydrophilic, nucleophilic, polar organic solvent such as dimethylsulfoxide, dimethylformamide, dimethylacetamide, tetrahydrofurane or tetramethylphosphoramide. Addition of iron compounds such as iron citrate, iron chloride and iron sulfate to the solution in an amount more than equivalent to α-tocopherol makes the effect of α-tocopherol and ubiquinone in living bodies more stable. The solution is used to control growth of plants.

5 Claims, No Drawings

BIOLOGICALLY ACTIVATING COMPOSITION

DESCRIPTION OF THE INVENTION

This invention relates to a biologically activating composition, and more particularly to a biologically activating composition containing α-tocopherol and ubiquinone as effective components, which is capable of controlling the growth of plants.

Generally, the higher plants have such properties that they grow, always depending upon the control of enviromental factors; at the same time they accumulate peculiar components within their bodies according to the enviromental factors at a certain growth stage; and the successive growth is made, while making themselves meet the enviromental conditions.

The present inventors have studied a relation between components of plants and plant growth, based on the environmental factors, while taking the biological activity of the plants mainly into consideration, and have found that various phenomena of vegetable growth including flowering are finally determined by a proportion of α-tocopherol to ubiquinone. Further, the present inventors have found that when α-tocopherol and ubiquinone are in a certain mol ratio and at a definite concentration with the plant bodies, the plants are always promoted for growth regardless of specific enviromental conditions.

As for the adequate proportion of -tocopherol and ubiquinone, it is in the range from 1:19 to 7:3, preferably from 1:4 to 3:2. The proper concentration ranges of the components are each from $10^{-15}$ mol/l to $10^{-2}$ mol/l preferably from $10^{-14}$ mol/l to $10^{-6}$ mol/l. That is to say, the present inventors have found that it is an essential condition that α-tocopherol and ubiquinone are each other in an equilibrium in a certain mol ratio in a cell on any level of cells, organs or individuals of vegetables so that they may continue their normal living activities.

Heretofore it has been generally believed that the solar growth or temperature sensitivity of plants is a property specific to the respective species of the plants, and that any flowering induction cannot be made under an environment unsuitable for the flowering, unless the environmental conditions are artificially changed. An art of the so-called electrically illuminated chrysanthemum for controlling the flowering of chrysanthemum by electric illumination at night is well known, but the artificial change of the environmental conditions requires a considerably large facility and a large amount of expenses, and therefore is almost impossible except very special cases.

According to the present invention, the environmental factors, which have been a great trouble for the growth control, can be compensated by adding a preparation containing α-tocopherol and ubiquinone to the plant bodies externally so that the molar ratio of α-tocopherol to ubiquinone becomes to a certain value within the plant bodies, without changing the environmental conditions, and as a result the restriction by the environment can be overcome thereby.

According to the present invention, the growth promotion can be made under any environmental condition only by supplying a solution of α-tocopherol and ubiquinone to seeds or roots of any plant as shown in Examples, for a very short time, and even under a condition which does not induce plants to flowering and fructification, the treated plants can be brought to flowering or fructification.

In order to make a mixture of α-tocopherol and ubiquinone most effective for controlling the growth of plants, it is most desirable to prepare the mixture in a homogeneous aqueous solution. That is to say, water-insoluble α-tocopherol and ubiquinone are prepared into a homogeneous aqueous solution in the presence of a surfactant and used as an activity promoter or activity retainer for the living things. The surfactant used in the present invention is nonionic surfactants nontoxic to the living bodies, and surfactants of polyoxyalkylene system are suitable. Particularly, polyoxyethylenesorbitane monostearate (Tween 60, a trademark of a product made by Atlas Powder Co., USA), and polyoxyethylenesorbitane monooleate (Tween 80, a trademark of a product made by Atlas Powder Co., USA) are most effective.

The homogeneous aqueous solution of α-tocopherol and ubiquinone is prepared as follows:

α-tocopherol and ubiquinone are precisely weighed and are thoroughly mixed with a nonionic surfactant in a suitable order, and then the resulting mixture is slowly diluted with water thereby to homogeneously disperse α-tocopherol and ubiquinone in water. The resulting homogeneous solution is further diluted with water to a proper concentration and used as a treating solution. In that case, it has been confirmed that a quantitative change in the surfactant has no direct relation to the activation effect of the treating solution upon the living bodies. To obtain a clear homogeneous aqueous solution, it is sufficient to mix α-tocopherol and ubiquinone with a surfactant in an amount of 10–20 times the total weight of the α-tocopherol and ubiquinone. Usually, α-tocopherol and ubiquinone are contained in the aqueous solution, each at a concentration of $10^{-3} - 10^{-4}$ mole/liter, and the surfactant is contained therein at a concentration of 0.2 to 0.5% by weight based on the total weight of the aqueous solution. The solution is then diluted to a desired concentration. The thus prepared aqueous solution of α-tocopherol and ubiquinone at a proper concentration has an affinity towards the living bodies, and the dispersibility of the treating solution through the living bodies is very excellent.

However, the thus prepared treating solution is relatively sensitive to air (oxygen) and light, when reserved, owing to chemical characteristics of α-tocopherol and ubiquinone, and therefore, there is such a fear that its power is gradually degraded. Even if the treating solution is reserved in a light-shielding vessel or in a reservation vessel where air is replaced with an inert gas, the degradation is quite inevitable.

According to the present invention, the power of the treating soluion of α-tocopherol and ubiquinone can be prevented from degradation and the treating solution can be reserved stably for a prolonged time, when the treating solution is treated as follows. That is, the homogeneous aqueous solution of α-tocopherol and ubiquinone can be stabilized by heating the solution at a temperature from 70°C to the decomposition temperature of α-tocopherol under the atmospheric pressure or under a pressure for a short time e.g. 5 minutes to 30 minutes immediately after the solution is prepared, and can be reserved in a stable state for a prolonged time when reserved in a light-shielded state.

In addition to said procedure for preparing the treating solution by using the surfactant, a clear homogeneous aqueous solution of α-tocopherol and ubiquinone can be prepared by making α-tocopherol and ubiquinone water-soluble by means of a hydrophilic, nucleophilic, polar organic solvent as a dispersion medium. The solvent used in the present invention is such nucleophic solvents as dimethyl sulfoxide, dimethylformamide, dimethylacetamide, tetrahydrofuran, and tetramethylphosphoramide. Since these solvents have a high solvation activity towards water-insoluble α-tocopherol and ubiquinone, and also have a high affinity towards water, these solvents can make α-tocopherol and ubiquinone water-soluble even used in a relatively small amount. The use of a solvent in an amount of 10% or less by weight based upon the resultant solution will be sufficient. It is well known that dimethyl sulfoxide, dimethylformamide, etc. have a high permeability, because of their high polarity or high affinity, and also have an excellent permeability even if applied to the living bodies. Particularly, dimethyl sulfoxide is valuable as a medicine. Therefore, these solvents are very advantageous for homogeneous and rapid dispersion of α-tocopherol and ubiquinone into individuals, when the individuals are treated with the treating solution.

As described above, the aqueous solution of α-tocopherol and ubiquinone is relatively unstable and is readily decomposable by the action of light or dissolved oxygen, but said solvents have an excellent solvation characteristic as the nucleophilic solvent, and act remarkably as a radical catcher. Therefore, it is expected that these solvents show also an excellent action as a stabilizer.

As explained above, various manners are available for maintaining the activity of various living bodies and tissues by means of α-tocopherol and ubiquinone as chemicals. It has been found that there are substances capable of keeping the α-tocopherol-ubiquinone system in a stable state in the living bodies. It has been confirmed that one of the substances having such an effect is iron ions. In that case, iron citrate, iron chloride, iron sulfate, etc. are used as iron compounds. Since the iron ions take part in the stabilization of the α-tocopherol-ubiquinone system, the addition of the iron compound, as an activator, can bring about more positive effect in broader range upon the abnormality of the living bodies due to various causes. An iron ion is used in an amount equivalent or more relative to α-tocopherol.

The aqueous solution of α-tocopherol and ubiquinone prepared at a proper concentration according to said procedures has an affinity towards the living bodies, and also has a very good dispersibility into the living bodies. Therefore, the dispersion of α-tocopherol and ubiquinone into the living bodies or their tissues through any of such procedures as absorption, immersion, surface coating, spraying, etc. can be made very good.

Now, the present invention as well as the procedure and effect thereof will be explained in detail, while referring to Examples.

EXAMPLE 1

4.3 mg of α-tocopherol and 100 mg of a surfactant (tween 80) were mixed with 100 ml of distilled water to prepare a solution A whose concentration was $10^{-4}$ mol/l.

6.6 mg of ubiquinone and 100 mg of the above surfactant were mixed with 100 ml of distilled water to prepare a solution B whose concentration was $10^{-4}$ mol/l.

By sampling suitable volumes of the solutions A and B, combining the resultant samples and diluting the resultant mixture to desired volumes, seven kinds of solutions in which the molar ratios of α-tocopherol and ubiquinone were as follows but the total sum of the moles of α-tocopherol and ubiquinone were maintained at $2 \times 10^{-7}$ mol/l, were prepared: 1:0, 8:2, 6:4, 5:5, 4:6, 2:8 and 0:1.

Seeds of radish (species: comet) germinated in advance, were immersed in each solution mentioned above, for 30 minutes, and thereafter the seeds were immediately transplanted into 1/5000-A. pots filled with quartz sand and cultivated in an incubation chamber under continuous illumination (30,000 lux) for nights and days at 25°C. Each pot had 5 radishes, but the 5 radishes were reduced to 3 per pot by thinning-out after one week, and seeds were cultivated as control where distilled water was used in place of the solution.

Stem length and flowering of the radishes after 45 days from the start of cultivation are given in Table 1.

Table 1

| α-tocopherol / ubiquinone | Stem length | Flowering |
|---|---|---|
| Control | 2.7 cm | non-differentiated |
| 0/1 | 12 cm | budding |
| 2/8 | 13.5 cm | budding |
| 4/6 | 18 cm | budding |
| 5/5 | 21 cm | flowered |
| 6/4 | 7 cm | budding |
| 8/2 | 2.3 cm | non-differentiated |
| 1/0 | 0.5 cm | non-differentiated |

EXAMPLE 2

| | |
|---|---|
| α-tocopherol | 4.3 mg |
| ubiquinone (coenzyme $Q_7$) | 6.6 mg |
| surfactant (Tween 80) | 200 mg |
| distilled water | 100 ml |

The emulsion obtained by mixing of the above mentioned materials was diluted to 1,000 times the original volume with water and the resulting solution was added to seeds of morning-glory (species: large-flowered purple), which were forced to germinate on a Petri dish in advance, for 30 minutes. Then, the seeds were immediately transplanted into 1/5,000-A. pots filled with quartz sand and cultivated in an incubation chamber under continuous illumination (luminescent lamp: 4,000 lux) for nights and days at 25°C. Each pot had five seeds and also seeds were cultivated as control where distilled water was used in place of the solution.

As a result, all the plants whose seeds were treated with the solution of α-tocopherol and ubiquinone were differentiated for flower buds, but the control was not flowered at all for a cultivation of 5 months after the seeding. Change in flowering ratio with time is given in Table 2.

Table 2

| Treatment | Differentiation for flower buds and flowering ratio | | | |
|---|---|---|---|---|
| | 50 days after seeding | | 85 days after seeding | |
| | Differentiated for flower buds | Flowered | Differentiated for flower buds | Flowered |
| Solution of α-tocopherol and ubiquinone | 100 % | 0 % | 100 % | 100 % |
| None (control) | 0 | 0 | 0 | 0 |

EXAMPLE 3

The emulsion prepared in Example 2 were diluted to 1,000 times the original volume with water, and the resulting solution was added to seeds of soybeans (species: Okuhara beans), which were forced to germinate in advance, for 30 minutes. The seeds were seeded in pots filled with soil and cultivated in a glass chamber at 30°C. Tests were continued for 23 days. The results are given in Table 3.

Table 3

| Treatment | length of grass | number of leaves | Fresh weight/plant | | Root nodule (per 5 plants) | |
|---|---|---|---|---|---|---|
| | | | above ground | under ground | number of adhesions | Fresh weight |
| Solution of α-tocopherol and ubiquinone | 71.2 cm | 7.0 | 3.6 g | 1.0 g | 53 | 442.9 mg |
| None (control) | 49.8 cm | 6.0 | 2.7 g | 0.6 g | 22 | 112.6 mg |

EXAMPLE 4

The emulsion prepared in Example 2 was diluted with 100 times the original volume with water to an aqueous solution having a concentration of $10^{-6}$ mol/l (solution A). Further, an aqueous solution containing 1,000 ppm iron citrate in terms of Fe was prepared (solution B). 10 ml of the solution A and 10 ml of the solution B were added to 980 ml of distilled water and thoroughly mixed by stirring, whereby a solution C was prepared.

Cucumber seedlings were established in a farm, and 50 cc of the solution was sprayed onto leaves once a day for two days per seedling. The seedlings were cultivated according to the ordinary manner for 67 days. At the same time, those sprayed with tap water in place of the solution C were cultivated as a control.

Total yields during said period of cultivation are shown in the following Table 4.

Table 4

| Treatment | Total yields/number of seedling | |
|---|---|---|
| | Number | Weight (g) |
| A solution of α-tocopherol and ubiquinone (coenzyme Q₇) | 9.0 | 1172 |
| None (control) | 4.6 | 531 |

EXAMPLE 5

The emulsion prepared in Example 2 was heated at 120°C for 30 minutes in an autoclave, and the resulting solution was diluted with water to an aqueous solution having a concentration of $10^{-7}$ mole/l. 10 egg plant seedlings were established in pots filled with farm soil at a rate of one seedling per pot. After 2 days from the establishment, 200 ml of the solution having said concentration of $10^{-7}$ mole/l was injected at the roots of egg-plant seedlings. The seedlings were cultivated in a green house at 25° to 30°C for 58 days, while applying ammonium sulfate and nitrogen and potassium phosphate fertilizers to the seedling properly. At the same time, those injected with water in place of the solution was cultivated as a control. The result is given in the following Table 5.

Table 5

| Treatment | Total yield/seedling | |
|---|---|---|
| | number | average weight (g) |
| A solution of α-tocopherol and ubiquinone (coenzyme Q₇) | 2.4 | 132 |
| None (control) | 1.8 | 92 |

What is claimed is:

1. A composition for promoting the growth of plants comprising a mixture of a α-tocopherol and ubiquinone in a mol ratio ranging from about 1:19 to about 7:3, said mixture being dispersed in water in the presence of a liquid medium selected from the group consisting of a non-ionic surfactant and a hydrophilic nucleophilic, polar, organic solvent in a concentration of each component of said mixture ranging between $10^{-15}$ to $10^{-12}$ mols per liter of the resultant dispersion.

2. A composition according to claim 1 wherein said solvent is selected from the group consisting of dimethyl sulfoxide, dimethyl formamide, dimethylacetamide, tetrahydrofuran and tetramethylphosphoramide.

3. A method for promoting the growth of plants which comprises applying to the plants a mixture of α-tocopherol and ubiquinone in a mol ratio ranging from about 1:19 to about 7:3, said mixture being dispersed in water in the presence of a liquid medium selected from the group consisting of a nonionic surfactant and a hydrophilic, nucleophilic, polar, organic solvent in a concentration ranging between $10^{-15}$ to $10^{-12}$ mols of the mixture per liter of the liquid medium.

4. A composition according to claim 1 wherein said non-ionic surfactant is of polyoxyalkylene system.

5. A composition according to claim 1 wherein said non-ionic surfactant is selected from the group consisting of polyoxyethylenesorbitane monostearate and polyoxyethylenesorbitane monooleate.

* * * * *